United States Patent [19]

Groninger

[11] 4,163,371

[45] Aug. 7, 1979

[54] VAPORIZER

[75] Inventor: Greg D. Groninger, Midland, Mich.

[73] Assignee: The Dow Chemical Company, Midland, Mich.

[21] Appl. No.: 827,275

[22] Filed: Aug. 24, 1977

[51] Int. Cl.$^2$ ............................................. F17C 7/02
[52] U.S. Cl. ............................................. 62/50; 122/33
[58] Field of Search ................... 62/50, 52; 122/33; 219/275

[56] References Cited

U.S. PATENT DOCUMENTS

| | | | |
|---|---|---|---|
| 3,346,718 | 10/1967 | Cooley et al. | 62/52 |
| 3,949,565 | 4/1976 | Roop | 62/52 |

OTHER PUBLICATIONS

Cheeseman, G. H. et al., "A Vapor Pressure Study of Mixtures of Bromine and Chlorine", *Australian Journal of Chemistry*, 1968, 21, pp. 289-297.

*Primary Examiner*—Ronald C. Capossela
*Attorney, Agent, or Firm*—James M. Kuszaj

[57] ABSTRACT

An apparatus and method for the vaporization of a mixture of two liquefied gases in chemical equilibrium with a binary compound thereof. The apparatus comprises an enclosed vessel having a liquid zone and a vaporized gas zone. A liquid supply means, in fluid communication with the liquid zone, passes the mixture to be vaporized as a liquid from a supply source into the vessel. A heating element, having a housing disposed about it, extends downward through a portion of the interior of the vessel and is adapted to supply sufficient heat to vaporize a gaseous mixture from the liquid zone. Means for superheating and removing the vaporized gaseous mixture from the vessel are provided. The method of vaporization comprises withdrawing the mixture as a liquid from a supply source and passing it into the vessel to form a liquid phase. The level of the liquid phase is maintained above a predetermined level and sufficient heat is supplied to vaporize a portion of the liquid phase at a temperature greater than the dew point temperature corresponding to vapor having substantially the same composition as the known composition of the liquefied gas mixture from the supply source at known pressure, thereby forming a gaseous mixture. The gaseous mixture is removed from the vessel.

6 Claims, 2 Drawing Figures

VAPORIZER

BACKGROUND OF THE INVENTION

The present invention relates generally to an apparatus and a method for vaporizing a liquid. More in particular, it relates to an apparatus and a method for vaporizing a mixture of liquefied gases in chemical equilibrium with a binary compound thereof.

Though the invention is applicable to the vaporization of various mixtures of liquefied gases, it will be explained in detail in connection with bromine chloride (BrCl), for this compound is becoming increasingly important as a brominating agent, oxidizing agent, and disinfectant.

Although chemists have long been familiar with many of the properties of bromine chloride, industrial processors and other users have displayed a reluctance to employ bromine chloride despite its obvious and pronounced advantages over either chlorine or bromine in many applications. This reluctance stems partly from the lack of handling and metering technology capable of precisely and predictably withdrawing uniform compositions of liquid bromine chloride from storage vessels, and introducing vaporized bromine chloride of substantially the same composition to a gas dispensing system. There is, therefore, a need for a vaporizing apparatus capable of efficiently, effectively, and accurately supplying gaseous bromine chloride for various industrial end uses.

A number of devices for converting a single component liquefied gas, such as chlorine or hydrogen, to a superheated gas are commercially available. Two such devices are described, for example, in U.S. Pat. Nos. 3,949,565 and 3,346,718.

In the operation of such devices, a single component liquefied gas is heated to boiling and converted to a superheated gas which is then discharged from the device. The heating is commonly accomplished by use of a heating element which is indirectly heated and is in continuous direct physical contact with the liquefied gas. For example, in U.S. Pat. No. 3,949,565 a heating element extends upward through the base of the device and contacts the reservoir of liquefied gas contained in the interior thereof.

A number of drawbacks have been encountered in attempting to employ these known devices generally, and more particularly in the vaporization of liquefied gas mixtures such as bromine chloride. For example, configurations wherein the heating element and the reservoir of liquefied gas are continuously in direct contact have proven undesirably corrosive to the heating element. Additionally, the liquefied gases that are vaporized usually contain a significant amount of nonvolatile residue. During vaporization, these residues tend to deposit at the bottom of the liquefied gas reservoir. When the heating element is in continuous direct contact with the reservoir, the nonvolatile residues deposit on the heating element causing a substantial decrease in the efficiency of heat transfer from the heating element to the contents of the reservoir. The build-up of nonvolatile residues also accelerates the rates of corrosion of the metal materials from which heating elements are commonly constructed.

Another drawback commonly encountered in using the commercially available devices is the difficulty in maintaining an unimpeded flow of liquid into the device. The most common problem occurs where the liquid entering the device is subjected to a pressure drop. As a result of the pressure drop, the liquefied gas feeding into the device prematurely vaporizes and deposits the nonvolatile residue in the feed lines to the reservoir and eventually plugs the system.

Another common problem in most vaporizer systems is the reliquefaction of the vaporized gas leaving the vaporizer. Reliquefaction of the gas causes plugging problems on the gas side of the vaporizer and also can create metering inaccuracy and potential safety hazards.

However, the major disadvantage of commercially available vaporizing devices is that they are not adapted to vaporize a mixture of two liquefied gases in chemical equilibrium with a binary compound thereof, such as bromine chloride. In the conventional devices where only a single component liquefied gas is being vaporized, the vapor above the liquefied gas reservoir in the apparatus will generally have the same chemical composition as the supply source regardless of changes in reservoir levels caused by temperature variation. Hence, the vapor removed from the vaporizer will have the same chemical composition as the liquid introduced into the vaporizer.

The situation changes when the liquid to be vaporized is a mixture of mole fractions of two liquefied gas components in chemical equilibrium with a binary compound of those gases. Then the vapor above the liquid gas reservoir in the vaporizer can have a composition substantially different from the supply source due to the complex liquid-vapor equilibrium established when two components of relatively different volatilities are present in both the liquid and vapor phase. In most applications, it is undesirable to withdraw a vaporized gas having a composition different from that of liquid feed material to the vaporizer.

The particular difficulties involved in vaporizing a mixture of two liquefied gases in chemical equilibrium with a binary compound thereof are best illustrated by bromine chloride. It is well-known that bromine chloride molecules exist in chemical equilibrium with the parent bromine molecule and chlorine molecule in both the gas and liquid phases in an equilibrium of the type 2 $BrCl \rightleftharpoons Br_2 + Cl_2$. Consequently, the liquid bromine chloride from which the gas must be vaporized is an equilibrium solution of equimolar amounts of molecular bromine and molecular chlorine each exerting its own characteristic vapor pressure.

In considering the equilibrium set up within a vaporizer at a particular pressure and temperature, between a two-component bromine chloride liquid solution and its vapor, it is helpful to consult a boiling-point composition diagram. In such a diagram, the pressure is fixed and the temperature at which the liquid and vapor are in equilibrium is plotted as a function of the mole fraction of the least volatile component. A typical boiling point diagram for bromine chloride is described by G. H. Cheesman and D. L. Scott in *Australian J. Chem*, 1968, 21, p. 289–97. The composition of the vapor and the composition of the liquid in equilibrium with it are shown on the same diagram. The vapor composition curve of the least volatile (bromine) component lies above the liquid composition curve. Consequently, at a given temperature (construct a horizontal line across the diagram), the vapor and liquid have different compositions, the liquid always being richer in the least volatile component (bromine). Consequently, the simple evaporation of a liquid bromine chloride pool would result in the initial removal of a vapor rich in the more volatile chlorine component. At the same time, the liquid composition would continually be changing until only bromine would be left to evaporate. It would be difficult to provide a bromine chloride gas of constant composition by the simple evaporation of a pool of bromine chloride.

It is therefore desirable to develop a vaporizer for vaporizing a mixture of two liquefied gases in chemical equilibrium with a binary compound of those gases. The vaporizer must be capable of vaporizing a gas having substantially the same composition as the liquid feed. In addition it should avoid plugging of the feed lines, excessive corrosion of the element, and reliquefaction of vapor all of which problems are present in conventional vaporizing devices. The apparatus of the present invention achieves these desirable results.

For the purposes of this specification, a vapor is defined as a gaseous substance having liquid suspended therein. While a gas is defined as a gaseous substance having substantially no liquid suspended therein.

SUMMARY OF THE INVENTION

An apparatus for vaporizing a mixture of two liquefied gases in chemical equilibrium with a binary compound thereof has been discovered. The apparatus comprises an enclosed vessel for containing the mixture to be vaporized. The vessel is defined by a generally upwardly-disposed shell having spaced walls defining a liquid zone and a vaporized gas zone. Liquid supply means in fluid communication with the liquid zone of the vessel are adapted to pass the mixture to be vaporized as a liquid from a supply source into the vessel. A generally vertically disposed heating element extends downward through the interior of the vessel and terminates above that portion of the liquid zone communicating with the liquid supply means. The heating element is adapted to supply sufficient heat to vaporize a gaseous mixture from the liquid zone. A housing is disposed about the heating element and contains a medium for transferring heat from the heating element to the vaporized gas zone. At least one thermal sensing element communicates with the interior of the vessel. Means for discharging the gaseous mixture from the vessel are provided.

In the practice of the present invention, a mixture of two liquefied gases in chemical equilibrium with a binary compound thereof is vaporized. The mixture of known composition and at a known temperature and a known pressure is withdrawn as a liquid from a supply source. The liquid mixture is then introduced through a liquid supply means into a liquid zone of the enclosed vessel to form a liquid phase. The uppermost level of the liquid phase is maintained above that portion of the liquid zone in communication with the liquid supply means. Sufficient heat is supplied to the liquid phase to vaporize a portion of the liquid phase at a temperature greater than the dew point temperature corresponding to vapor having substantially the same composition as the known composition of the liquefied gas mixture from the supply source at the known pressure, thereby forming a gaseous mixture. The gaseous mixture is removed from the vessel.

DESCRIPTION OF THE PREFERRED EMBODIMENT

Figure 1:
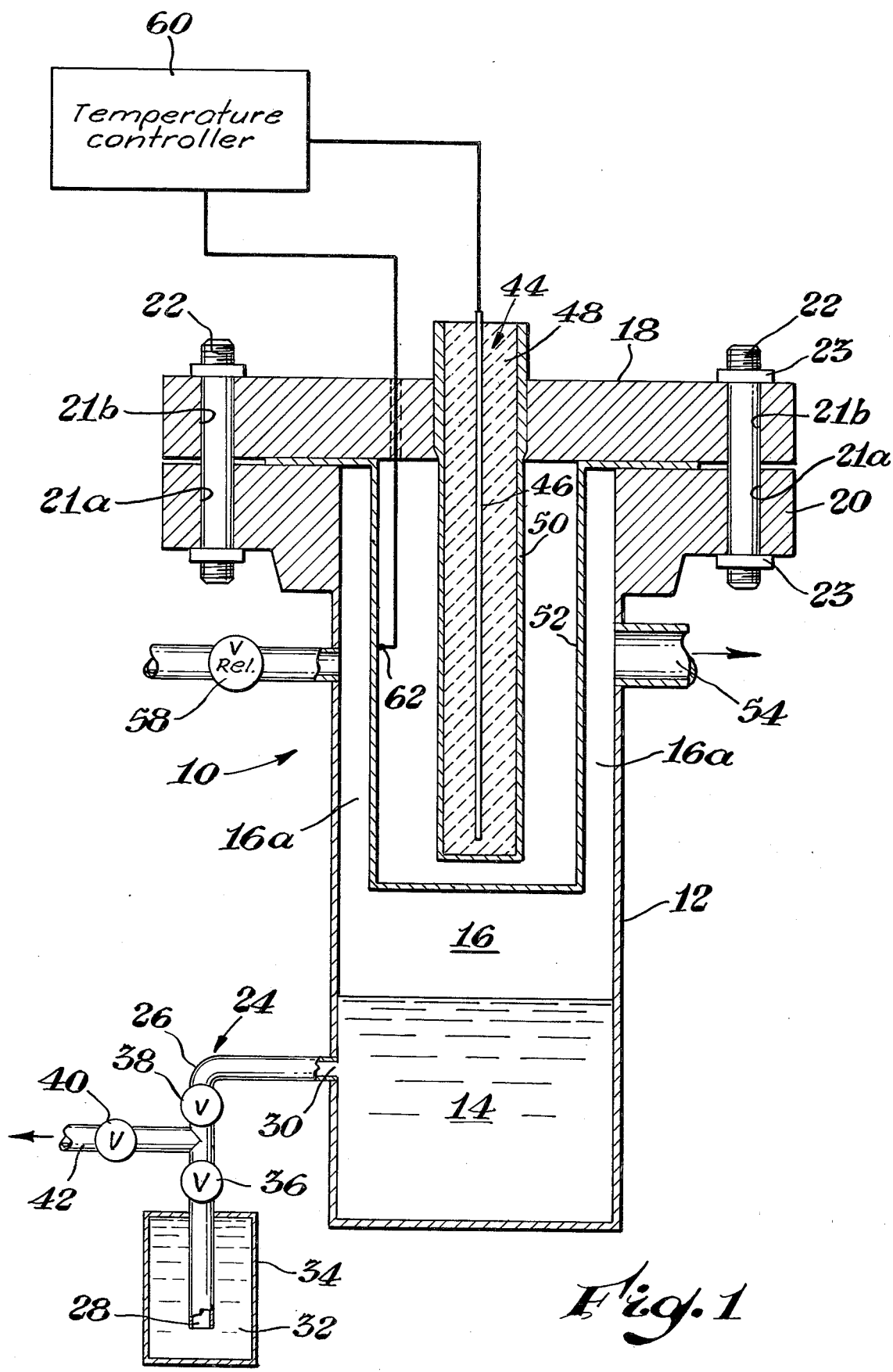
FIG. 1 is a longitudinal sectional view of the one embodiment of an apparatus in accordance with the present invention.

Referring now to the drawing, there is shown in FIG. 1 one embodiment of a vaporizer in accordance with the present invention. The vaporizer comprises an enclosed vessel generally designated by the reference numeral 10. As recognized, the vessel may have any suitable shape but in the embodiment shown the vessel is defined by a generally upwardly disposed cylindrical shell 12 having spaced walls defining a liquid zone 14 and a vaporized gas zone 16.

The vessel 10 can be constructed of a single piece of material in which case the walls of shell 12 are formed into an entirely self-enclosed configuration. In other embodiments, the shell 12 can be partially open at either or both the upper or lower end, and means for sealably enclosing the vessel at the open end of the shell 12 provided. For ease of maintainance, the latter configuration is often preferred.

The vessel can be constructed from any material that is resistant to the corrosive effects of the liquefied gas and vapor at the operating temperatures. Suitable material of construction can include nickel, Monel, Incoloy, and the like.

FIG. 1 shows an embodiment wherein vessel 10 is defined by the cylindrical shell 12, having an open upper end. Means for sealably enclosing the vessel 10 at its upper end, such as cap 18, are provided. Shell 10 correspondingly is provided at its upper end with suitable means for rapidly attaching the cap 18. As is well recognized in the art, a number of attaching means, such as welding, flanges, or screwed fittings, can be used. In the embodiment shown, the attaching means include an outwardly extending flange 20 circumferentially disposed about the cylindrical shell 12 near its open upper end. The flange 20 has a plurality of apertures 21a therein for receiving bolts 22. Bolts 22 pass through corresponding apertures 21b in the cap 18 and apertures 21a in flange 20 and are lockably secured by nuts 23 to sealably enclose the vessel.

A liquid supply means, generally designated by numeral 24 (not shown to scale), is located in a spaced relationship adjacent to the vessel 10, and is in fluid communication with the liquid zone 14 of the vessel 10. The liquid supply means 24 includes a supply conduit 26 with an inlet end 28 and an outlet end 30. The inlet end 28 communicates with a liquid supply source 32 of a mixture of two liquefied gases in chemical equilibrium with a binary compound thereof. The outlet end 30 communicates with the liquid zone 14 of the vessel 10. The liquid supply source 32 is generally contained in a pressurized container, such as cylinder 34, at a known temperature, pressure and equilibrium composition. The cylinder 34 is equipped with feeding valve 36 communicating with supply conduit 26. The supply conduit can optionally contain additional valves, such as 38 and 40 which, when properly engaged, allow liquid from liquid supply source 32 to be optionally withdrawn from cylinder 34 and passed through venting conduit 42. The liquid supply means 24 has no flow control or pressure reducing devices incorporated therein, and is adapted to pass the liquid mixture from the liquid supply source 32 to the vessel 10 without partial vaporization of the liquid mixture prior to introduction into the liquid zone 14 of the vessel 10.

The vaporizer is provided with means for supplying sufficient heat to the liquid mixture introduced into the liquid zone 14 of vessel 10 to vaporize a gaseous mixture therefrom. Suitable heating means should be disposed in the vaporized gas zone but should not be in constant contact with the liquid mixture in the liquid zone 14. Suitable heating means can include electrical heating elements, steam tubes, and the like. However, in the illustrated embodiment, a generally vertically disposed heating element 44 extends downwardly into the interior of the vessel 10 through an aperture in the cap 18. The heating element 44 in this embodiment can take the form of an electric resistance heater having a resistance wire 46 surrounded by ceramic material 48. The entire assembly is encased within a metal sleeve 50 which is coextensive with the heating element 44, but is slightly larger in cross-section.

A housing, such as that depicted by reference numeral 52, is disposed about the heating element 44 and sleeve 50. The housing should be capable of separating the heating element 44 and sleeve 50 from direct contact with the vaporized gaseous mixture, or the liquid mixture, yet should be adapted to efficiently transfer heat from said heating element to the vaporized gaseous mixture or the liquid mixture. In one embodiment, the housing is generally "U" shaped in section with the longitudinal edges terminating in outwardly extending flanges adapted to be held between flange 20 and cap 18. The housing can contain in the interior thereof a medium for transferring heat from the heating element 44 to the vaporized gas mixture or the liquid mixture. Suitable heat transfer medium can include gases, such as air, or liquids such as ethylene glycol.

The exterior portion of housing 52 and the interior walled portion of shell 12 are constructed to define a narrow vaporized gas zone 16a. Passageway 16a is of sufficient size to, in combination with the heating element 44, superheat gas vaporized from the liquid zone 14.

Means for removing the vaporized gaseous mixture from the vessel 10 is provided. The removing means includes a discharge conduit 54 in communication at one end with the gas zone 16a and at the other end with a suitable gas dispensing system (not shown).

If desired, a pressure relief means, such as valve 58, can be employed to communicate with the vaporized gas zones 16 and 16a. Also thermal insulating means (not shown) can be disposed about the exterior walls of vessel 10, to reduce the amount of heat loss. Thermal insulation is most effectively employed if none is disposed about the liquid zone 14.

A temperature control means 60 is provided for coordinating heating within the vaporizer. The control means 60 is linked to at least one thermosensing element 62 which is located in the interior of the vessel 10. In the embodiment shown, it is attached to the interior wall of housing 52 and is employed to monitor the temperature of the housing which is in contact with the vaporized gas. However, it can be located in other suitable positions as desired. The thermosensing element transmits a signal to control unit 60. Control unit 60 acts to balance the heat output of heating element 44 by supplying electricity to the resistance wire 46 to maintain a substantially predetermined constant temperature. In the embodiment shown, the power to the heating element 44 is controlled by proportional control unit. This allows the heating element to remain on a reduced power at all times during operation, and avoids hot spots in the middle of the heating element.

The method of the present invention is applicable to the vaporization of any mixture of two liquefied gases in chemical equilibrium with a binary compound thereof provided that the two are compatible in the liquid phase with each other. Generally, the two liquid gases also have substantially different volatilities. Bromine chloride (BrCl), is especially suitable for vaporization by the present invention, since it exists in equilibrium with molecular bromine and molecular chlorine in both the gas and liquid phase, and since BrCl is generally shipped as a liquid, but usually employed as a gas.

In the practice of the present process, the mixture of two liquefied gases in equilibrium with a binary compound thereof is withdrawn as a liquid from a suitable supply source, such as cylinder 34. The liquid mixture within the supply source generates a characteristic vapor pressure above the liquid which is a function of the temperature of the liquid and the mole fraction of each component. The vapor pressure above the liquid can be monitored directly by a suitable meter or determined by monitoring the temperature and composition.

The mole fraction of each liquefied gas component present can be expressed as $$x_B = M_B/M_B + M_C$$

$$x_C = M_C/M_B + M_C$$

where $M_B$ and $M_C$ are the number of component B and of component C in a given quantity of solution and $x_B$ and $x_C$ are the mole fractions of components B and C, respectively. The mole fraction are such that $x_A + x_B = 1$. Consequently, the liquid mixture to be vaporized can have any mole fraction of one component $(x_A)$ mixed with $1-x_A$ mole fraction of the second component. In the embodiment wherein bromine chloride is the liquid mixture to be vaporized, there are equal mole fractions of bromine and chlorine present $(x_A = x_B = 0.5)$. This situation is often referred to as equimolar mixture.

The liquid mixture from the supply source enters the vessel through supply conduit 26 and forms a liquid phase in the liquid zone 14. The pressure above the liquid phase is slightly less than the pressure above the liquid in the supply source. As a consequence, additional liquid enters the vessel and the level of the liquid phase rises.

The uppermost level of the liquid phase is allowed to rise until the liquid is at least above that portion of liquid zone in communication with the liquid supply means, for example, above outlet end 30. It has been discovered that by maintaining the uppermost level of the liquid phase above the inlet to the vessel and supplying heat and maintaining a suitable temperature, the need for flow control or pressure reducing devices between the vessel and the external supply source is eliminated. Consequently, undesirable partial vaporization of the liquid mixture in the supply line prior to introduction into the liquid zone is avoided.

As the level of the liquid phase rises, the liquid comes into direct contact with the heater housing 52. The liquid phase absorbs sufficient heat from the heating element to reach a steady state wherein a portion of the liquid phase is vaporized at a substantially constant temperature greater than the dew point temperature corresponding to vapor having substantially the same composition as the known composition of the liquefied mixture from the supply source at the known pressure. A gaseous mixture having a substantially constant composition is thereby formed.

The dew point temperature is defined as the temperature at which the first liquid forms within a vapor mixture being cooled. The dew point temperature for the vapor can be calculated given the pressure and the composition of the liquid from the supply source and the pure components vapor pressure at a given temperature. First, it is necessary to determine the composition of the liquid phase which is in equilibrium with the vapor phase having the composition of the supply source. This can be determined by constructing boiling point composition diagrams at a number of fixed pressures as described by Gordon M. Barrow, *Physical Chemistry*, 2nd Edition, pp. 602–603; and G. H. Cheesman, D. L. Scott, *Australian J. Chem.*, 1968 21, 287–97. Using this liquid composition and known pure component vapor pressure, the vapor pressure of the liquid which would be in equilibrium with the vapor at several temperatures can be calculated by the equation $$P = P°X_i/Y_i$$

where $P°$ = vapor pressure of pure component
$X_i$ = liquid composition of the pure component in the mixture
$Y_i$ = gas composition of the pure component in the mixture
$P$ = vapor pressure of dew point mixture at a given temperature (T)

For example, for bromine chloride, it can be determined from a boiling point diagram that in order to produce a vapor having equimolar fractions of bromine and chlorine, the liquid in equilibrium with the vapor at 760 mm pressure must have 0.81 mole fraction bromine and 0.19 mole fraction chlorine. Consequently, $X_i = 0.81$ Br and $Y_i = 0.50$ Br. The vapor pressure of $Br_2$ is known to be 760 mm Hg at 588° C. Thus $$P = (760)(0\ )/0.50 = 1231.2 \text{ mm of Hg}.$$

Figure 2:
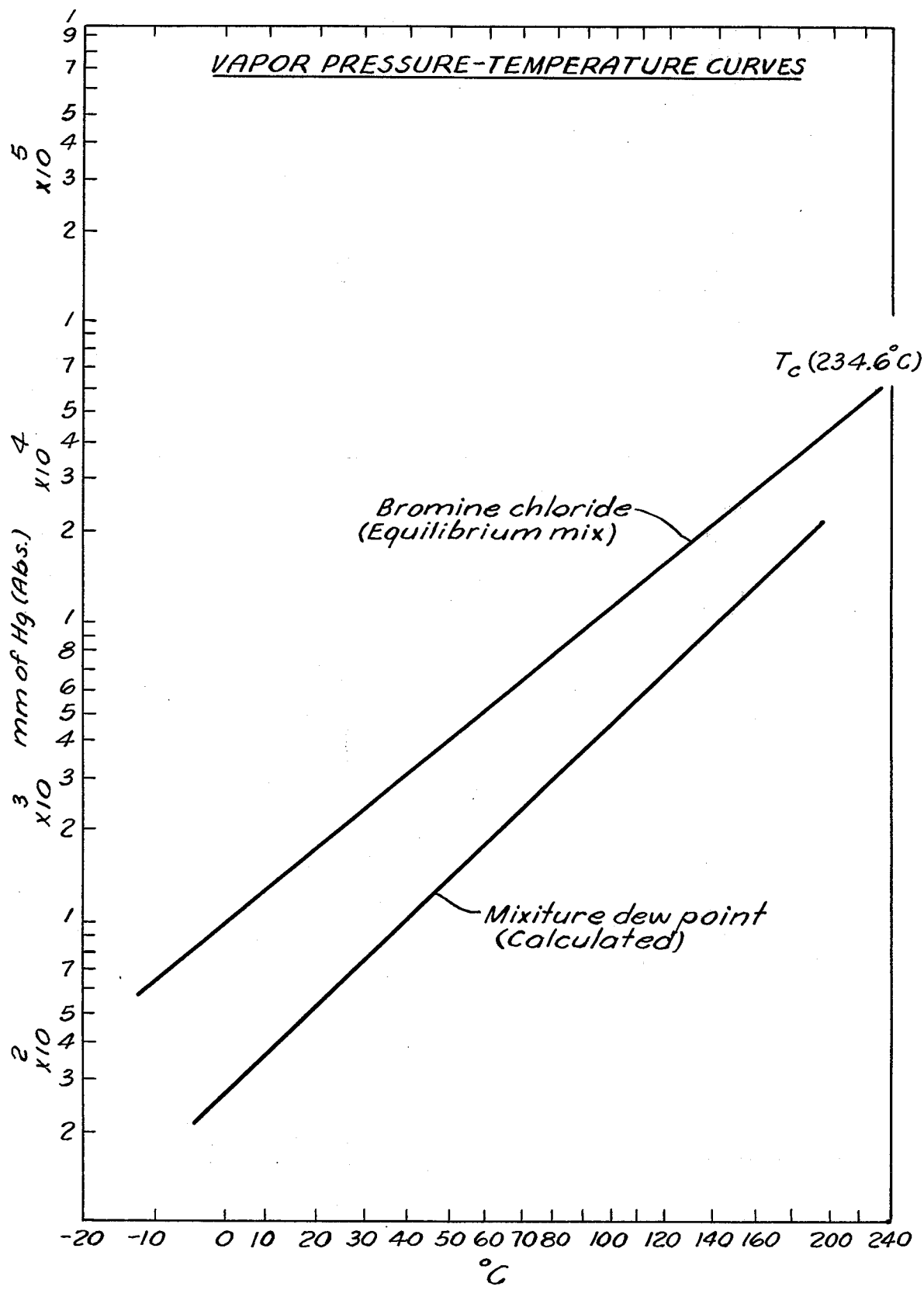
FIG. 2 is a graphic representation of the vapor pressure plotted as a function of temperature for an equimolar mixture of bromine and chlorine in equilibrium with molecular bromine chloride.

This vapor pressure is plotted versus the temperature (58.8° C.). After several other vapor pressures and temperatures have been plotted, a line characteristic of the dew point mixture is obtained. In the operation of the vaporizer, the vapor pressure is known and the graph can be read (by constructing a horizontal line) to determine the minimum dew point mixture operating temperature that must be maintained to vaporize a gaseous mixture having the proper composition. FIG. 2 shows a typical graph of the dew point temperature for equimolar mixtures of bromine chloride.

As the gas rises through the vaporized gas zone 16, it remains in contact with the source of heat and it is forced to transverse the narrow vaporized gas zone 16a. As a result, it becomes superheated and any droplets of liquid which have been carried along with the gas are evaporated.

The superheated gaseous mixture is removed from the vessel through the discharge conduit 54. The gaseous mixture can then be passed to a suitable metering device for use in any desired end use. In one embodiment (not shown), the superheated gaseous mixture is removed from the vessel and reduced in pressure by use of any well-known vacuum regulating device. The vacuum is regulated such that the temperature and pressure of the system will not permit condensation of the gaseous mixture at ambient temperature (about 70° F.). The gaseous mixture is maintained at substantially constant pressure and is easily metered by well-known techniques, such as by the use of a rotameter. Suitable vacuum can be created by using any well-known ejector apparatus which will also allow the gaseous mixture to be mixed with other liquids, such as water. This arrangment is especially suited to the introduction of bromine chloride into waste water.

The following example serves to illustrate the use of the method and apparatus of the present invention. However, the scope of the invention is not intended to be limited thereto.

Example

An apparatus substantially as shown in the drawing was employed in the following example. The apparatus included a vertically-disposed cylindrical pressure vessel which was constructed of schedule 40, 2 inch inside diameter nickel pipe, 28½ inches in length and closed at the bottom. A forged steel cap was attached to the top of the vessel by bolting the cap to a forged steel lap joint flange surrounding the vessel. A ¾" Chromalex ® cartridge type electric resistance heater extended downward through an aperture in the cap. A steel casing constructed of schedule 40 steel pipe surrounded the heaing element. A housing enclosing the heating element and casing was constructed of schedule 40, 1½ inch inside diameter schedule 40 nickel, and extended 21½ inches from the cover into the interior of the vessel. The housing contained air in the interior thereof.

An equimolar mixture of liquefied bromine and liquefied chlorine was continuously passed into the liquid zone of the pressure vessel from a cylinder containing 250 pounds of bromine chloride at a rate of about 55 pounds per day. The liquid mixture in the cylinder was at a temperature of 24° C. and a pressure of 25 pounds per square inch gauge (psig). The mixture contained trace amounts of nonvolatile residues such as ferric chloride, ferric oxide, ferric bromide and organics. The liquid mixture entered the vessel through a ½ inch inside diameter nickel inlet conduit, the center of which conduit was about 3 inches from the bottom of the vessel. The liquid mixture was allowed to form a pool in the liquefied gas zone of the vessel about 4 inches in depth.

After the uppermost level of the liquid pool was above the inlet conduit, and in contact with the heating element housing, the heating element was activated and the temperature within the vessel increased to 155° C. and maintained substantially constant. The pressure within the vessel was slightly less than that in the supply cylinder. The liquid mixture within the vessel was continuously vaporized and removed as a gaseous mixture from the vessel at a rate of about 55 lb./day. Additional liquid from the supply source was introduced to maintain a substantially uniform liquid pool level in the vessel during vaporization.

The temperature within the interior of the vessel was monitored by a thermocouple attached to a proportional temperature control unit manufactured by the Athena Corporation (Model 74 Series Temperature Controller).

Solid nonvolatile residues of nickel bromide, chromium, ferric chloride, ferric oxide, and organics were deposited in the bottom of the vessel and were identified by X-ray diffraction when the vessel was shut down for maintenance.

The composition of the vaporized gas removed from he vessel was found to be an equimolar mixture of molecular bromine and molecular chlorine having substantially the same composition of the liquefied gas mixture in the cylinder minus the nonvolatile impurities removed. No plugging of supply line was observed.

What is claimed is:

1. A method for vaporizing a mixture of two liquefied gases in chemical equilibrium with a binary compound thereof comprising:
    (a) withdrawing the mixture of known composition at a known temperature and a known pressure as a liquid from a supply source;
    (b) introducing the liquid mixture through a liquid supply means into a liquid zone of an enclosed vessel to form a liquid phase;
    (c) maintaining the uppermost level of said liquid phase at least above that portion of the liquid zone in communication with the liquid supply means;
    (d) heating a portion of said liquid phase in said enclosed vessel which is located above said liquid phase which is in communication with said liquid supply means to a temperature above the dew point temperature corresponding to vapor having substantially the same composition as the liquefied gas mixture thereby to vaporize a portion of such liquid phase to form such vapor and super heating said vapor to vaporize any of such liquid phase dispersed therein; and
    (e) removing said gaseous mixture from said vessel.

2. The method of claim 1 wherein the liquefied gases in the mixture are of differing volatility.

3. The method of claim 1 wherein the mixture of two liquefied gases in chemical equilibrium with a binary compound thereof are bromine and chlorine in equilibrium with bromine chloride.

4. The method of claim 3 wherein the bromine and chlorine are present in equimolar amounts.

5. The method of claim 1 wherein the temperature greater than the dew point temperature is substantially constant.

6. The method of claim 1 wherein the gaseous mixture removed from the vessel has a substantially constant composition.

* * * * *

UNITED STATES PATENT AND TRADEMARK OFFICE
CERTIFICATE OF CORRECTION

PATENT NO. : 4,163,371
DATED : August 7, 1979
INVENTOR(S) : Greg D. Groninger

It is certified that error appears in the above-identified patent and that said Letters Patent are hereby corrected as shown below:

In Col. 6, line 37, insert --moles of-- after the word "of".

In Col. 7, line 9, insert the word --gas-- before the word "mixture" at the beginning of the line.

In Col. 7, line 49, rewrite the formula to read as follows:

--P = (760)(0.81)/0.50 = 1231.2 mm of Hg.--

In Col. 8, line 14, delete "arrang-" and insert --arrange- --.

Col. 8, line 35, delete "heaing" and insert --heating--.

Col. 9, line 9, at the beginning of the line, delete "he" and insert --the--.

Signed and Sealed this

Thirteenth Day of November 1979

[SEAL]

Attest:

RUTH C. MASON
Attesting Officer

LUTRELLE F. PARKER
Acting Commissioner of Patents and Trademarks